(12) United States Patent  
Saito (10) Patent No.: US 8,907,209 B2  
(45) Date of Patent: Dec. 9, 2014

(54) PHOTOELECTRIC CONVERSION ELEMENT

(75) Inventor: Yasuteru Saito, Kyoto (JP)

(73) Assignee: Dai-Ichi Kogyo Seiyaku Co., Ltd., Kyoto (JP)

( * ) Notice: Subject to any disclaimer, the term of this patent is extended or adjusted under 35 U.S.C. 154(b) by 15 days.

(21) Appl. No.: 13/979,200

(22) PCT Filed: Jan. 11, 2012

(86) PCT No.: PCT/JP2012/000125  
§ 371 (c)(1),  
(2), (4) Date: Jul. 11, 2013

(87) PCT Pub. No.: WO2012/096170  
PCT Pub. Date: Jul. 19, 2012

(65) Prior Publication Data  
US 2013/0291943 A1    Nov. 7, 2013

(30) Foreign Application Priority Data

Jan. 13, 2011   (JP) ................... 2011-004940  
Jun. 22, 2011   (JP) ................... 2011-138488

(51) Int. Cl.  
    *H01L 51/46*      (2006.01)  
    *H01G 9/20*       (2006.01)

(52) U.S. Cl.  
    CPC .......... *H01G 9/2013* (2013.01); *H01G 9/2018* (2013.01); *H01G 9/2031* (2013.01); *H01G 9/2059* (2013.01); *Y02E 10/52* (2013.01); *Y02E 10/542* (2013.01)  
    USPC .......................................... 136/263; 438/82

(58) Field of Classification Search  
    CPC ......................... H01G 9/2013; H01G 9/2018  
    USPC .......................................... 136/263; 438/82  
    See application file for complete search history.

(56) References Cited

FOREIGN PATENT DOCUMENTS

| JP | 2003-51343 | 2/2003 |
|----|------------|--------|
| JP | 2008-16442 | 1/2008 |

(Continued)

OTHER PUBLICATIONS

International Search Report issued by the Japanese Patent Office on Mar. 6, 2012, for International Patent Application No. PCT/JP2012/000125.

(Continued)

*Primary Examiner* — Jayne Mershon  
(74) *Attorney, Agent, or Firm* — Finnegan, Henderson, Farabow, Garrett & Dunner, L.L.P.

(57) ABSTRACT

Disclosed is a photoelectric conversion element which includes a semiconductor electrode, an opposite electrode, and an electrolyte layer held between the semiconductor electrode and the opposite electrode, and which is a photoelectric conversion element of high practical use using a redox couple which has high transparency and ease of enclosure and exhibits high performance compared to an iodine redox couple. An electrolyte layer includes a redox couple formed of compounds represented by General Formula (1) and Formula (2), and ionic liquid having bis(fluorosulfonyl)imide anion represented by Formula (3).

[Chem. 1]

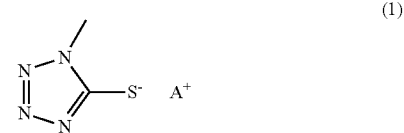

(1)

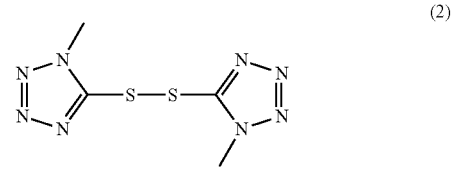

(2)

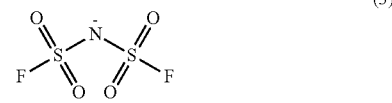

(3)

3 Claims, 4 Drawing Sheets

(56) References Cited

FOREIGN PATENT DOCUMENTS

| | | |
|---|---|---|
| JP | 2010-113988 | 5/2010 |
| JP | 2010-231956 | 10/2010 |

OTHER PUBLICATIONS

Nusbaumer et al., "$Co^{\pi}(dbbip)_2^{2+}$ Complex Rivals Tri-iodide/Iodide Redox Mediator in Dye-Sensitized Photovoltaic Cells," J. Phys. Chem. (2001), 105:10461-64.

Nusbaumer et al., "An Alternative Efficient Redox Couple for the Dye-Sensitized Solar Cell System," Chem. Eur. J. (2003), 9:3756-63.

Sapp et al., "Substituted Polypyridine Complexes of Cobalt (II/III) as Efficient Electron-Transfer Mediators in Dye-Sensitized Solar Cells," J. Am. Chem. Soc. (2002), 124:11215-22.

Oskam et al., "Pseudohalogens for Dye-Sensitized $TiO_2$ Photoelectrochemical Cells," J. Phys. Chem. (2001),.105:6867-73.

Wang et al., "A solvent-Free, $SeCN^-/(SeCN)_3^-$ Based Ionic Liquid Electrolyte for High-Efficiency Dye-Sensitized Nanocrystalline Solar Cells," J. Am. Chem. Soc. (2004), 126:7164-65.

Wang et al., "An organic redox electrolyte to rival triiodide/iodide in dye-sensitized solar cells," Nature Chemistry (Apr. 4, 2010), pp. 1-5.

PHOTOELECTRIC CONVERSION ELEMENT

TECHNICAL FIELD

The present invention relates to a photoelectric conversion element which is suitably used as a dye-sensitized solar cell or the like.

BACKGROUND ART

In recent years, various solar cells have been proposed as a photoelectric conversion element which converts light energy into electrical energy. Among them, a dye-sensitized solar cell which is described in "Nature" 1991, 353, p. 737-740 or the like by Gratzel et. al. of Ecole Polytechnique de Lausanne in Switzerland in 1991 is used with low cost for materials and processes to be used, and thus, the practical use thereof is expected as the solar cell with low cost.

In general, the dye-sensitized solar cell is configured with a semiconductor electrode which includes a photoelectric conversion layer which is formed of a semiconductor which has adsorbed a dye on a conductive base material, an opposite electrode which is provided with a catalyst layer on a conductive base material opposite to the semiconductor electrode, and an electrolyte layer which is held between the semiconductor electrode and the opposite electrode.

An electrolyte which is obtained by dissolving an iodine redox couple in an organic solvent is generally used for the electrolyte of the dye-sensitized solar cell. The iodine redox couple has excellent performance in which ion conductivity is high, and a speed of reducing a dye in an oxidation state is fast, while responsiveness on a conductive glass surface or a titanium oxide surface of an acting pole is low.

However, since a sublimation property of iodine is high, element sealing is difficult and it causes a decrease of element durability under high temperature conditions. In addition, since iodine has a high corrosive property with respect to a lot of metals, metals which can be used in an element substrate are limited, and an expensive substrate such as conductive glass is necessary to be used. Further, in a case of an element, particularly with a large area, metal power collecting lines are provided on the substrate for high performance, in many cases, however, as in this case, it is necessary to provide a process of preventing contact of the electrolyte and the power collecting lines for preventing corrosion of the metal power collecting lines, operating steps are complicated, and an effective area of the element is decreased.

Further, the iodine redox couple has a strong absorbing property in a visible light area, and in a case of using a solvent with high viscosity such as ionic liquid, it is necessary to increase a concentration of the iodine redox couple to be sufficiently operated as a solar cell element, and accordingly, light absorption of a dye is disturbed and it becomes a reason for performance degradation. In addition, in a case of emphasizing a colorful property of the solar cell using various dyes, particularly in a case of a blue element, the color of iodine becomes impeditive, and thus it is not suitable in a viewpoint of element design.

As described above, the iodine redox couple has high performance as the redox couple, however, since it also has problems, a redox couple which can be replaced with the iodine redox couple is required, and there have been some investigation into the matter (for example, see NPL 1 to 6 and PTL 1).

In NPL 1 to 3, there is a proposal for using a cobalt complex for a redox couple. The cobalt complex shows the same performance as the iodine redox couple under weak optical conditions, however, since it has a large molecular size, a moving speed of the redox couple is slow, and the performance is degraded by half under pseudo solar light irradiation conditions. In addition, the cobalt complex is expensive compared to the iodine redox couple, and it cannot be said to be used practically.

In NPL 4 and 5, there is a proposal for using $(SCN)_2/SCN^-$, and $(SeCN)_2/SeCN^-$ for a redox couple. $(SCN)_2/SCN^-$ are operated as the redox couple, however it shows a half or less extent of performance compared to the iodine redox couple. $(SeCN)_2/SeCN^-$ shows high performance compared thereto, however, has problem in safety, and it cannot be said to be used practically. As redox couples which can be used for the photoelectric conversion element other than the iodine redox couple, $Br_2/Br^-$, $Fe(CN)_6^{4-}/Fe(CN)_6^{3-}$, $Fe^{2+}/Fe^{3+}$, $S^{2-}/S_n^{2-}$, $Se^{2-}/Se_n^{2-}$, $V^{2+}/V^{3+}$, quinone/hydroquinone, and the like are used, however, there are problems in performance, stability, safety, and the like, and the performance comparable to the iodine redox couple has not been obtained.

As shown in PTL 1, the applicants have made clear that a sulfide compound is used as a redox couple and a conductive polymer is used as a counter electrode catalyst, to be efficiently operated for the photoelectric conversion element. In addition, NPL 6 shows that high photoelectric conversion performance is achieved by using a sulfide redox couple and an organic solvent as an electrolyte.

However, in a case of using a volatile organic solvent such as acetonitrile or ethylene carbonate shown in NPL 6, as an electrolyte of the dye-sensitized solar cell, enclosure of the electrolyte is difficult and practical element durability is difficult to be obtained. Accordingly, there are many examples of using ionic liquid having significantly low volatile property as the electrolyte solvent, however, since the ionic liquid has higher viscosity than the general volatile organic solvent, as shown in PTL 1, there is a problem in that the element performance is lower than the organic solvent electrolyte. In addition, NPL 6 shows a case of using tetramethylammonium salts of the sulfide compound as a reductant of the redox couple, however, in this case, there are problems in that solubility to the ionic liquid is insufficient and satisfied element performance is not exhibited.

In addition, PTL 1 shows a sulfide compound including a thiadiazole skeleton as the redox couple, however, there are problems in that a disulfide compound which is an oxidant of the redox couple particularly has low solubility to the electrolyte solvent such as the ionic liquid (less than 0.2 M), and at the time of using a solvent with high viscosity and low volatile property such as ionic liquid or the like, element performance is degraded. Further, in a case where the concentration of the redox couple is set to be high, there is a problem in that the stability of the redox itself is degraded.

Therefore, an electrolyte solution which can be replaced with an iodine-based solution which does not include a sublimation property and a light absorption property in a visible light area, and has high solubility to a electrolyte solvent, and stability and high performance in the solvent, is required.

CITATION LIST

Patent Literature

[PTL 1] JP-A-2008-016442

Non Patent Literature

[NPL 1] J. Phys. Chem. B, 105, 10461-10464 (2001)
[NPL 2] Chem. Eur. J. 9, 3756-3763 (2003)

[NPL 3] J. Am. Chem. Soc., 124, 11215-11222 (2002)
[NPL 4] J. Phys. Chem. B. 105, 6867-6873 (2001)
[NPL 5] J. Am. Chem. Soc., 126, 7164-7165 (2004)
[NPL 6] Nature. Chem., 2, 385-389 (2010)

SUMMARY OF INVENTION

Technical Problem

The present invention has been made to address the aforementioned problems and provide a photoelectric conversion element of high practical use using a redox couple which has high transparency and ease of enclosure, and exhibits high performance, compared to the iodine redox couple.

Solution to Problem

The present inventors have been investigating to solve the problems, and as a result, the inventors have found that, in the electrolyte layer, a redox couple formed of compounds respectively represented by the following General Formula (1) and Formula (2) has high performance and stability as the redox couple of the photoelectric conversion element, the redox couple is dissolved in ionic liquid represented by Formula (3) in high concentration, and high performance as the electrolyte using the ionic liquid is shown, and have found that, by using a conductive polymer catalyst as an opposite electrode, it is possible to produce a photoelectric conversion element showing high element photoelectric conversion efficiency which is substantially the same as that using the iodine redox couple of the related art. The present invention has been made based on the findings.

That is, a photoelectric conversion element of the present invention includes a semiconductor electrode, an opposite electrode, and an electrolyte layer held between the semiconductor electrode and the opposite electrode, and the electrolyte layer includes a redox couple formed of a compound represented by the following General Formula (1) and a compound represented by Formula (2), and ionic liquid including bis(fluorosulfonyl) imide anion represented by Formula (3).

[Chem. 1]

(1)

[Chem. 2]

(2)

[Chem. 3]

(3)

Herein, in General Formula (1), A represents Li, an imidazolium compound represented by the following Formula (4), or a pyrrolidinium compound represented by General Formula (5).

[Chem. 4]

(4)

[Chem. 5]

(5)

Herein, in Formula (4), $R^1$ represents an alkyl group having 1 to 12 carbon atoms, $R^2$ represents a hydrogen atom or a methyl group, and in Formula (5), $R^3$ represents an alkyl group having 1 to 12 carbon atoms.

In the photoelectric conversion element, it is preferable that a concentration of the compound represented by General Formula (1) in the electrolyte layer be equal to or more than 0.5 mol/L, and a concentration of the compound represented by Formula (2) be equal to or more than 0.5 mol/L.

In addition, it is preferable that the opposite electrode contain a conductive polymer catalyst having catalytic activity with respect to the redox couple.

Advantageous Effects of Invention

The photoelectric conversion element of the present invention has photoelectric conversion efficiency and stability comparable to the element using the iodine redox couple of the related art, and is a photoelectric conversion element which solves the problems of transparency which was a weak point of the iodine redox couple of the related art. In detail, since the redox couple used in the present invention does not have strong absorption property in a visible light area, a design property of the element is improved, and since the ionic liquid having a low volatile property is dissolved in high concentration, even in a case of using the ionic liquid as a solvent, degradation in element performance due to light absorption of the electrolyte layer shown in the iodine redox couple does not occur, and thus, it is possible to provide a photoelectric conversion element of high practical use.

DESCRIPTION OF EMBODIMENTS

Hereinafter, an embodiment of the present invention will be described in detail with reference to the drawings.

Figure 1:
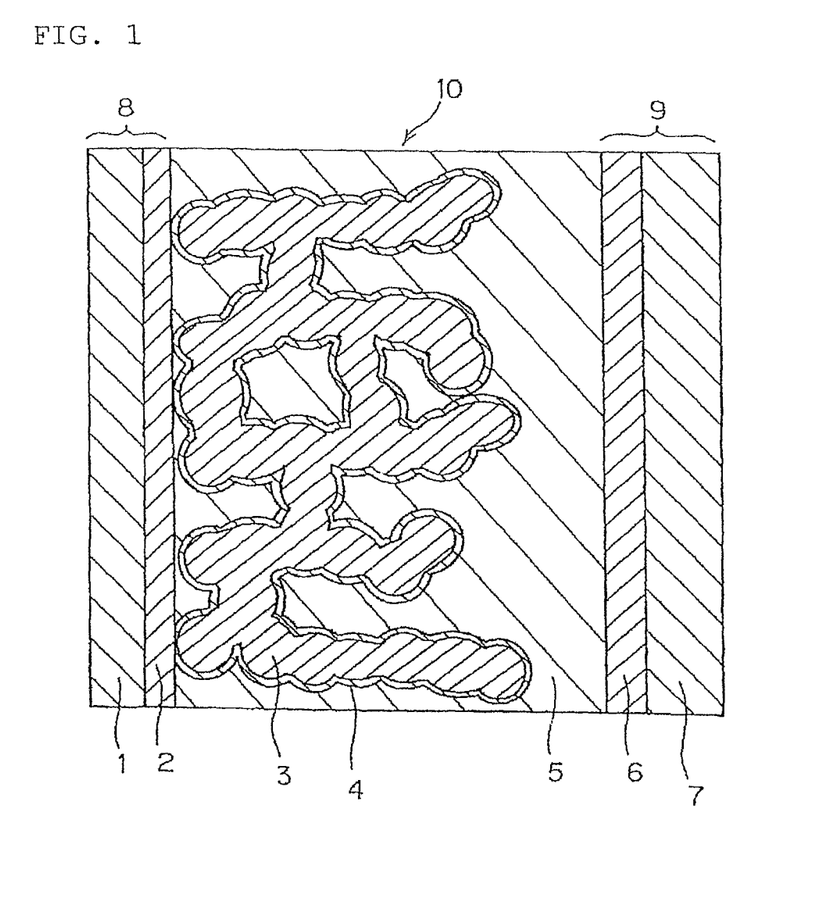
FIG. 1 is a schematic cross-sectional view showing a basic structure of a photoelectric conversion element according to an embodiment of the present invention.

FIG. 1 is a schematic cross-sectional view showing an example of a photoelectric conversion element 10 of the present invention.

In FIG. 1, reference numeral 1 denotes a transparent substrate, reference numeral 2 denotes a transparent conductive film, reference numeral 3 denotes a porous metal oxide semiconductor layer, reference numeral 4 is a sensitizing dye, reference numeral 5 denotes an electrolyte layer, reference numeral 6 denotes a catalyst layer, reference numeral 7 denotes an electrode base material which supports the reference numeral 6, reference numeral 8 denotes an electrode substrate, and reference numeral 9 denotes an opposite electrode, respectively.

As shown in the drawing, the porous metal oxide semiconductor layer 3 is formed on a surface of the electrode substrate 8 formed of the transparent substrate 1 and the transparent conductive film 2 formed thereon, and in addition, the sensitizing dye 4 is adsorbed onto a surface of the porous metal oxide semiconductor 3. The opposite electrode 9 in which the catalyst layer 6 is formed on a surface of the electrode base material 7 is disposed by the intermediary of the electrolyte layer 5 of the present invention, and a photoelectric conversion element 10 is formed.

Hereinafter, preferred embodiments of each constituent element of the photoelectric conversion element 10 will be described.

[Transparent Substrate]

For the transparent substrate 1 configuring the electrode substrate 8, a transparent substrate which transmits visible light can be used, and transparent glass can be suitably used. In addition, a transparent substrate which is obtained by processing a glass surface so as to scatter incident light can also be used. Further, without being limited to the glass, a plastic plate, a plastic film, or the like can also be used, as long as it transmits light.

A thickness of the transparent substrate 1 is not particularly limited since it is different depending on a shape or using conditions of the photoelectric conversion element 10. However, in a case of using glass or plastic for example, in consideration of durability at the time of practical use, the thickness thereof is preferably to be about 1 mm to 1 cm and flexibility is necessary, and in a case of using a plastic film or the like, the thickness thereof is preferably about 1 µm to 1 mm.

[Transparent Conductive Film]

As the transparent conductive film 2, a transparent conductive film which transmits visible light and has conductivity can be used. As such a material, a metal oxide is used, for example. Although not particularly limited, fluorine-doped tin oxide (hereinafter, abbreviated to "FTO"), indium oxide, a mixture of tin oxide and indium oxide (hereinafter, abbreviated to "ITO"), an antimony-doped tin oxide, zinc oxide, or the like can be suitably used, for example.

In addition, an opaque conductive material can also be used, if the visible light is transmitted by a process of scattering or the like. As such a material, a carbon material or metal is used. As the carbon material, it is not particularly limited, but, graphite, carbon black, glassy carbon, carbon nanotube, or fullerene is used, for example. In addition, as the metal, it is not particularly limited, however, platinum, gold, silver, ruthenium, copper, aluminum, nickel, cobalt, chrome, iron, molybdenum, titanium, tantalum, or an alloy thereof is used, for example.

Accordingly, as the electrode substrate 8, a conductive material consisting of at least one kinds of the conductive materials described above can be provided and formed on the surface of the transparent substrate 1. Alternatively, by embedding the conductive material into the material configuring the transparent substrate 1, it is possible to integrate the transparent substrate 1 and the transparent conductive film 2 to provide the electrode substrate 8.

As a method of forming the transparent conductive film 2 on the transparent substrate 1, in a case of using a metal oxide, a liquid layer method such as a sol-gel method, a gas phase method such as spattering or CVD, coating of dispersed paste, or the like is used. In addition, in a case of using the opaque conductive material, a method of fixing powder or the like with a transparent binder or the like is used.

For integrating the transparent substrate 1 and the transparent conductive film 2, there is a method of mixing the conductive film material as a conductive filler at the time of molding of the transparent substrate 1.

The thickness of the transparent conductive film 2 is not particularly limited since the conductivity is different depending on the material to be used, however, in FTO-coated glass which is generally used, the thickness thereof is 0.01 µm to 5 µm, and is preferably 0.1 µm to 1 µm. In addition, the necessary conductivity is different depending on an area of the electrode to be used, and as the area of the electrode is wider, the conductivity is required to have lower resistance, however, in general, the conductivity thereof is equal to or less than 100Ω/□, preferably equal to or less than 10Ω/□, and more preferably equal to or less than 5 Ω/□.

Since the thickness of the electrode substrate 8 configured of the transparent substrate 1 and the transparent conductive film 2 or the electrode substrate 8 obtained by integrating the transparent substrate 1 and the transparent conductive film 2 is different depending on a shape or using conditions of the photoelectric conversion element 10 as described above, it is not particularly limited, however, in general the thickness thereof is about 1 µm to 1 cm.

[Porous Metal Oxide Semiconductor]

As the porous metal oxide semiconductor 3, it is not particularly limited, however, titanium oxide, zinc oxide, tin oxide, or the like is used, particularly titanium dioxide, and furthermore, anatase-type titanium dioxide are suitable.

In addition, in order to decrease an electric resistance value, a grain boundary of the metal oxide is desirable to be small. In addition, in order to adsorb larger amounts of sensitizing dyes, the size of a specific surface area of the semiconductor layer is desirable to be large, and in detail, is desirable to be 10 $m^2$/g to 200 $m^2$/g. Further, in order to increase a light absorption amount of the sensitizing dyes, it is desirable to provide a width to a particle size of the oxide to be used to scatter the light, or to provide a large oxide semiconductor particle having a particle size of about 300 nm to 400 nm on a porous layer as a reflective layer.

The porous metal oxide semiconductor layer 3 is not particularly limited, and can be provided on the transparent conductive film 2 by a well-known method. For example, there are a sol-gel method, a method of coating paste of a dispersion element, electrocrystallization and electrodeposition.

The thickness of the semiconductor layer 3 is not particularly limited since the optimal value is different depending on the oxide to be used, but is generally 0.1 µm to 50 µm, and preferably 3 µm to 30 µm.

[Sensitizing Dye]

The sensitizing dye 4 may be a sensitizing dye which can be excited by solar light to be able to perform electron injection to the metal oxide semiconductor 3, and it is possible to use a dye which is generally used for the photoelectric conversion element. However, in order to improve conversion efficiency, it is desirable that the absorption spectrum be overlapped with the solar light spectrum in a broad wavelength range and light resistance be high.

The sensitizing dye 4 is not particularly limited, however, is desirably a ruthenium complex, particularly a ruthenium-polypyridine complex, and more desirably a ruthenium complex represented by $Ru(L)_2(X)_2$. Herein, L represents 4,4'-dicarboxy-2,2'-bipyridine, a quaternary ammonium salt thereof, or a polypyridine ligand to which a carboxyl group is introduced, and X represents SCN, Cl, or CN. For example, bis(4,4'-dicarboxy-2,2'-bipyridine)diisothiocyanate ruthenium complex or the like is used.

As other dyes, metal complex dyes other than ruthenium, for example, an iron complex, a copper complex, and the like are used. Further, an organic dye such as a cyan dye, a porphyrin dye, a polyene dye, a coumalin dye, a cyanine dye, a squalene dye, a styryl dye, an eosin dye, or an indoline dye is used.

In order to improve electron injection efficiency to the metal oxide semiconductor 3, it is desirable that the dyes include a linking group with the metal oxide semiconductor 3. The linking group is not particularly limited, however, a carboxyl group, a sulfone acid group, a hydroxyl group, or the like is desirable.

In addition, by combining the dye which absorbs a red region or a near-infrared region and a visible light transparent electrolyte of the present invention, it is possible to produce a blue or clear photoelectric conversion element, and it is possible to expand the usage of the element such as usage of requiring a colorful property.

As an example of the solvent used for dissolving the dye, alcohols such as ethanol, a nitrogen compound such as acetonitrile, ketones such as acetone, ethers such as diethyl ether, a halogenated aliphatic hydrocarbon such as chloroform, an aliphatic hydrocarbon such as hexane, an aromatic hydrocarbon such as benzene, or an ester such as ethyl acetate is used. The dye concentration in the solvent can be suitably adjusted depending on the types of the dye and the solvent to be used, and in order to be sufficiently adsorbed onto the semiconductor surface, it is desirable to have some extents of high concentration. For example, concentration of equal to or more than $4 \times 10^{-5}$ mol/L is desirable.

The method of adsorbing the sensitizing dye 4 onto the porous metal oxide semiconductor 3 is not particularly limited, and a method of immersing the electrode substrate 8 on which the porous metal oxide semiconductor 3 is formed in the solution in which the dye is dissolved, under conditions of room temperature and atmosphere pressure, is used for example. It is preferable that the immersing time be suitably adjusted so as to evenly form a monomolecular film of the sensitizing dye 4 on the semiconductor layer 3, by types of the semiconductor, dye, and solvent to be used and the concentration of the dye. In addition, by performing immersing under heating, it is possible to efficiently perform adsorption.

[Electrolyte Layer]

The electrolyte layer 5 used in the present invention contains a redox couple formed of a compound represented by General Formula (1) and a compound represented by Formula (2). In addition, the compound represented by General Formula (1) is a reductant, and the compound represented by Formula (2) is an oxidant.

[Chem. 6]

(1)

[Chem. 7]

(2)

In General Formula (1), A represents Li, an imidazolium compound represented by the following Formula (4), or a pyrrolidinium compound represented by the following General Formula (5).

[Chem. 8]

(4)

In General formula (4), $R^1$ represents an alkyl group having 1 to 12 carbon atoms preferably having 2 to 6 carbon atoms, and $R^2$ represents a hydrogen atom or a methyl group.

[Chem. 9]

(5)

In General formula (5), $R^3$ represents an alkyl group having 1 to 12 carbon atoms, and preferably having 2 to 6 carbon atoms.

Detailed examples of the compound represented by Formula (1) include 1-methyl-5-mercapto-1,2,3,4-tetrazole: lithium salt (Li-MTZT), 1-methyl-5-mercapto-1,2,3,4-tetrazole: 1-methyl-3-ethyl imidazolium salt (EMIm-MTZT), 1-methyl-5-mercapto-1,2,3,4-tetrazole: 1,2-dimethyl-3-propyl imidazolium salt (DMPIm-MTZT), 1-methyl-5-mercapto-1,2,3,4-tetrazole: 1-methyl-1-propyl pyrrolidinium salt (MPPy-MTZT), 1-methyl-5-mercapto-1,2,3,4-tetrazole: 1-methyl-3-propyl imidazolium salt, 1-methyl-5-mercapto-1,2,3,4-tetrazole: 1-methyl-3-butyl imidazolium salt, 1-methyl-5-mercapto-1,2,3,4-tetrazole 1-methyl-3-hexyl imidazolium salt, 1-methyl-5-mercapto-1,2,3,4-tetrazole: 1,2-dimethyl-3-butyl imidazolium salt, 1-methyl-5-mercapto-1, 2,3,4-tetrazole: 1,2-dimethyl-3-hexyl imidazolium salt, 1-methyl-5-mercapto-1,2,3,4-tetrazole 1-methyl-1-ethyl pyrrolidinium salt, 1-methyl-5-mercapto-1,2,3,4-tetrazole: 1-methyl-1-butyl pyrrolidinium salt, 1-methyl-5-mercapto-1,2,3,4-tetrazole: 1-methyl-1-hexyl pyrrolidinium salt, and the like.

In addition, the compound represented by Formula (2) is 5,5'-dithiobis(1-methyl-1H-tetrazole) ((MTZT)₂).

Further, a solvent which dissolves the redox couple contains ionic liquid including bis(fluorosulfonyl)imide anion represented by Formula (3).

[Chem. 10]

(3)

Detailed examples of the ionic liquid include 1-methyl-3-ethyl imidazolium bis(fluorosulfonyl)imide, 1,3-dimethyl imidazolium bis(fluorosulfonyl)imide, 1-methyl-3-propyl imidazolium bis(fluorosulfonyl)imide, 1-methyl-3-butyl imidazolium bis(fluorosulfonyl)imide, 1-methyl-3-hexyl imidazolium bis(fluorosulfonyl)imide, 1,2-dimethyl-3-propyl imidazolium bis(fluorosulfonyl)imide, 1,2-dimethyl-3-butyl imidazolium bis(fluorosulfonyl)imide, 1,2-dimethyl-3-hexyl imidazolium bis(fluorosulfonyl)imide, 1-methyl-1-ethyl pyrrolidinium bis(fluorosulfonyl)imide, 1-methyl-1-propyl pyrrolidinium bis(fluorosulfonyl)imide, 1-methyl-1-butyl pyrrolidinium bis(fluorosulfonyl)imide, 1-methyl-1-hexyl pyrrolidinium bis(fluorosulfonyl)imide, and the like.

Commercially available products can be used for the redox couple and the ionic liquid, or the materials of the commercial product can be subject to synthesis by a well-known method to be used.

The concentration of the compound (reductant) represented by General Formula (1) in the electrolyte layer (solvent) is preferably equal to or more than 0.5 mol/L, and more preferably 0.5 mol/L to 3 mol/L. If the concentration of the compound represented by General Formula (1) is less than 0.5 mol/L, there are concerns in that charge transporting performance of the redox couple is not sufficient and a current value of the element is decreased. If the concentration thereof exceeds 3 mol/L, as the viscosity of the electrolyte is increased, there are concerns in that the charge transporting performance of the redox couple is decreased, and the performance of the element is decreased.

In addition, the concentration of the compound (oxidant) represented by Formula (2) in the electrolyte layer (solvent) is preferably equal to or more than 0.5 mol/L, and more preferably 0.5 mol/L to 1.4 mol/L. If the concentration of the compound represented by Formula (2) is less than 0.5 mol/L, there are concerns in that the charge transporting performance of the redox couple is not sufficient and the current value of the element is decreased. If the concentration thereof exceeds 1.4 mol/L, there is a concern in that the compound (oxidant) of Formula (2) is precipitated.

Further, a rate (molar ratio) of the compound represented by General Formula (1) with respect to the compound represented by Formula (2) is preferably equal to or more than 0.8, more preferably equal to or more than 1, and even more preferably equal to or more than 1.2. In addition, the upper limit of the rate is preferably equal to or less than 5 and more preferably equal to or less than 3.

In a case where the compound (reductant) represented by General Formula (1) with respect to the compound (oxidant) represented by Formula (2) is excessively used in a molar ratio, since charge transfer performance is improved or an exchange reaction of the charge between the oxidant and the reductant easily occurs, it is considered that the element performance is improved.

A supporting electrolyte or an additive can be further added to the electrolyte layer 5 if necessary, within a range of not departing from the object of the present invention and not degrading the properties of the electrolyte layer. Examples of the supporting electrolyte include a lithium salt, an imidazolium salt, a quaternary ammonium salt, and the like. In addition, examples of the additive include a base such as t-butylpyridine, N-methyl imidazole, N-methyl benzimidazole, or N-methylpyrrolidone, thiocyanates such as guanidium thiocyanate, and the like. Further, by adding a suitable gelator, it is possible to perform physical or chemical gelatification.

[Opposite Electrode]

The opposite electrode 9 has a structure in that the catalyst layer 6 is formed on the surface of the electrode base material 7. Since the electrode base material 7 is used as a support and a collector of the catalyst layer 6, it is preferable that the conductivity be provided on the surface portion thereof.

As the material, a metal or a metal oxide having conductivity, a carbon material, or a conductive polymer is suitably used, for example. Examples of the metal include platinum, gold, silver, ruthenium, copper, aluminum, nickel, cobalt, chrome, iron, molybdenum, titanium, tantalum, and an alloy thereof. The carbon material is not particularly limited, however, graphite, carbon black, glassy carbon, carbon nanotube, or fullerene is used, for example. In addition, in a case of using a metal oxide such as FTO, ITO, indium oxide, zinc oxide, or antimony oxide, since the material is transparent or translucent, it is possible to increase an amount of incident light to the sensitizing dye layer 4.

In addition, if a process is performed so that at least the surface of the electrode base material 7 has conductivity, an insulator such as glass or plastic may be used, for example. As a processing method of providing conductivity to the insulator, a method of coating a part of or the entire surface of the insulating material with the conductive materials described above, for example, in a case of using a metal, a solution method such as plating or electrocrystallization, or a gas-phase method such as a sputtering method or vacuum deposition is used. In a case of using the metal oxide, a sol-gel method or the like can be used. In addition, a method of mixing one or a plurality of kinds of powder or the like of the conductive materials and the insulating material, or the like is used.

Further, even in a case of using the insulating material as the base material 7 of the opposite electrode 9, by providing the catalyst layer 6 having high conductivity on the base material 7, the catalyst layer 6 alone can achieve both functions of the collector and the catalyst, and can be used as the opposite electrode 9.

In addition, the shape of the electrode base material 7 is not particularly limited as it can be changed according to the shape of the photoelectric conversion element 10 to be used as the catalyst electrode, and may be a plate shape or a film shape to be bent. Further, the electrode base material 7 may be transparent or opaque, however, since it is possible to increase an amount of incident light to the sensitizing dye layer 4, and since it is possible to improve a design property depending on the cases, it is desirable to be transparent or translucent.

As the electrode base material 7, FTO film-attached glass, ITO film-attached PET, or an ITO film-attached PEN film is generally used, however, since the conductivity is different depending on the materials to be used, the thickness of the conductive layer is not particularly limited. For example in the FTO film-attached glass, the thickness thereof is 0.01 μm to 5 μm, and preferably 0.1 μm to 1 μm.

In addition, required conductivity is different depending on the area of the electrode to be used, and as the area of the electrode is wider, the conductivity is required to have lower resistance, however, in general, the conductivity thereof is equal to or less than 100Ω/□, preferably equal to or less than 10Ω/□, and more preferably equal to or less than 5 Ω/□.

The thickness of the electrode base material 7 is not particularly limited since it is different depending on the shape or using conditions of the photoelectric conversion element 10 as described above, however, the thickness thereof is generally about 1 μm to 1 cm.

The catalyst layer 6 is not particularly limited as long as it has an electrode property which can make the reduction reaction which reduces the oxidant of the redox couple in the electrolyte to the reductant to rapidly proceed, however, a material which is obtained by coating chloroplatinic acid and thermal treatment, a platinum catalyst electrode to which platinum is deposited, a carbon material such as activated carbon, glassy carbon, or carbon nanotube, an inorganic sulfur compound such as cobalt sulfide, a conductive polymer such as polythiophene, polypyrrole, or polyaniline, or the like can be used, and among them, the conductive polymer catalyst can be preferably used.

As a preferred detailed example of a monomer configuring the conductive polymer catalyst used in the present invention, a thiophene compound represented by the following General Formula (6) is used.

[Chem. 11]

(6)

In Formula (6), $R^4$ and $R^5$ each independently represent a hydrogen atom, an alkyl group or an alkoxy group having 1 to 8 carbon atoms, an aryl group having 6 to 12 carbon atoms, a cyano group, a thiocyano group, a halogen group, a nitro group, an amino group, a carboxyl group, a sulfo group, or a phosphonium group, and $R^4$ and $R^5$ may be combined to each other to form a ring.

In more detail, thiophene, tetradecyl thiophene, isothianaphtene, 3-phenylthiophene, 3,4-ethylenedioxythiophene, and the derivatives thereof can be suitably used, and among them, 3,4-ethylenedioxythiophene and the derivative thereof can be preferably used. Examples of the derivative of 3,4-ethylenedioxythiophene include hydroxylmethyl-3,4-ethylenedioxythiophene, aminomethyl-3,4-ethylenedioxythiophene, hexyl-3,4-ethylenedioxythiophene, octyl-3,4-ethylenedioxythiophene, and the like. In addition, one of the thiophene compounds may be used alone, or two or more thereof may be used to form the conductive polymer catalyst layer 6.

The monomer used for forming the conductive polymer catalyst layer 6 desirably has conductivity as a polymerized film of equal to or more than $10^{-9}$ S/cm.

In addition, it is desirable to add a dopant to the conductive polymer catalyst layer 6 in order to improve the conductivity. As the dopant, a well-known material can be used without any particular limitation.

As detailed examples of the dopant, a halogen anion of iodine, bromine, chlorine, or the like, a halide anion of hexafluorophosphorus, hexafluoroarsenic, hexafluoro antimony, tetrafluoroboron, perchloric acid, or the like, an alkyl group-substituted organic sulfonate anion of methanesulfonic acid, dodecyl sulfonic acid, or the like, a cyclic sulfonate anion of camphorsulfonic acid or the like, an alkyl group-substituted or -unsubstituted benzenemono or disulfonate anion of benzenesulfonic acid, p-toluenesulfonic acid, dodecyl benzenesulfonic acid, or benzendisulfonic acid, an alkyl group-substituted or -unsubstituted anion of naphthalenesulfonic acid with substituted 1 to 3 sulphonate groups of 2-naphthalenesulfonic acid, 1,7-naphthalenedisulfonic acid, or the like, an alkyl group-substituted or -unsubstituted biphenyl sulfonate ion of anthracene sulfonic acid, anthraquinone sulfonic acid, alkylbiphenyl sulfonic acid, biphenyldisulfonic acid, or the like a polymer sulfonate anion of polystyrene sulfonic acid, naphthalenesulfonic acid formalin condensate, or the like, a substituted or unsubstituted aromatic sulfonate anion, a boron compound anion of bis salicylate boron, his catecholate boron, or the like, a heteropoly acid anion of molybdophosphoric acid, tungstophosphoric acid, tungstomolybdophosphoric acid, or the like, imide acid, or the like is used. The dopant can be used with one kind or by combining two or more kinds.

In order to suppress desorption of the dopant, the dopant is more desirably an organic acid anion than the inorganic anion, and it is desirable that pyrolysis or the like hardly occur. In addition, the dopant of a low-molecular compound is more desirable than the dopant of a high-molecular compound, since catalytic activity with respect to the redox couple of the present invention is higher. In detail, p-toluenesulfonic acid, dodecyl benzenesulfonic acid, or naphthalenesulfonic acid is used.

A used amount of the dopant in the conductive polymer catalyst layer is not particularly limited since the optimal value thereof is different depending on the type of the dopant to be used, however, the used amount thereof is preferably 5 mass % to 60 mass %, and more preferably 10 mass % to 45 mass %.

When forming the conductive polymer catalyst layer, the dopant can coexist with a conductive high-molecular monomer.

The conductive polymer catalyst layer 6 is formed on the electrode base material 7. The forming method is not particularly limited, however, for example, a method of forming a film from a melted state or a dissolved solution of the conductive polymer, is used.

In addition, since a porous state having a larger surface area is desirable, a method of performing oxidative polymerization the monomer chemically or electrochemically, in a state where the solution including the monomer of the conductive polymer and the electrode base material 7 come in contact with each other, is suitably used, for example.

In addition, a method of forming the layer by screen printing, spray coating, brush coating, or the like on the electrode base material 7, after processing the conductive polymer powder in a paste state, an emulsion state, or a state of a mixture containing a polymer solution and a binder, can be also used.

Among them, as the forming method of the conductive polymer catalyst layer 6, the electropolymerization method or the chemical polymerization method is preferable, and the chemical polymerization method is particularly preferable. The chemical polymerization method is a method of performing oxidative polymerization of the polymerized monomer using an oxidation agent. On the other hand, the electropolymerization method is a method of forming a film of the conductive polymer on the electrode such as metal by performing electrolytic oxidation in the solution containing the polymerized monomer.

As the oxidation agent used in the chemical polymerization method, iodine, bromine, a halide such as bromine iodide, chlorine dioxide, iodic acid, periodic acid, or chlorous acid, a metal halide such as antimony pentafluoride, phosphorous pentachloride, phosphorous pentafluoride, aluminium chloride, or molybdenum chloride, a high-valent metal salt such as permanganate, bichromate, chromic anhydride, ferric salt, or cupric salt, a protonic acid such as sulfuric acid, nitric acid, or trifluoromethane sulfuric acid, an oxygen compound such as sulfur trioxide or nitrogen dioxide, a peroxoacid such as hydrogen peroxide, ammonium persulfate, or sodium perborate or salts thereof, a heteropoly acid such as molybdophosphoric acid, tungstophosphoric acid, or tungstomolybdophosphoric acid or the salts thereof, or the like, is used, and at least one thereof can be used.

The chemical polymerization method described above is suitable for bulk production, however, if an oxidant agent is acted in the solution containing an aromatic compound monomer, the obtained polymer becomes in a particle form or in a massive form, and it is difficult to exhibit desirable porosity and cast in an electrode shape. Accordingly, after the electrode base material 7 is immersed in the solution containing either one of the aromatic compound monomer or the oxidant agent, or, after coating the solution thereto, is immersed in the solution obtained by dissolving the other component, or coated with the solution, and the polymerization in the surface of the electrode base material 7 proceeds, and thus, the conductive polymer is desirably formed.

Alternatively, after adding an additive for decreasing the polymerization speed to the solution obtained by mixing the monomer and a polymerization initiator, and forming a film under conditions in which the polymerization does not occur at room temperature, by performing heating reaction, a porous conductive polymer film can be produced. The method of forming a film is not particularly limited, however, as an example, a spin-coating method, a cast method, a squeegee method, or a screen printing method is used.

For the additive for decreasing the polymerization speed, according to a well-known document "Synthetic Metals" 66, (1994) 263, in a case where the polymerization initiator is a high-valent metal salt, for example, an Fe (III) salt, since oxidation potential of the Fe (III) salt changes depending on pH, by adding a base, it is possible to delay the polymerization speed. As an example of the base, imidazole or dimethylsulfoxide is used.

The solvent for dissolving and mixing the monomer, the polymerization initiator, and the additive is not particularly limited as long as it dissolves the compounds to be used, and does not dissolve the electrode base material 7 and the polymer substance, however, examples thereof include alcohols such as methanol, ethanol, propanol, or normal-butanol.

The mixing ratio of the monomer, the polymerization initiator, and the additive changes depending on the compounds to be used, target polymerization degree and the polymerization speed, however, the molar ratio with respect to the monomer, that is, the monomer:the polymerization initiator is preferably 1:0.3 to 1:10, and the molar ratio with respect to the polymerization initiator, that is, the polymerization initiator: the additive is preferably 1:0.05 to 1:4.

In addition, the heating conditions in a case of heating polymerization after coating the mixing solution is different depending on the types of the monomer, the polymerization catalyst, and the additive to be used, and the mixing ratio, concentration, coating film thickness and the like thereof, however, as the suitable conditions, the heating temperature when heating in air is 25° C. to 120° C., and the heating time is between 1 minute and 12 hours.

In addition, a method of forming the conductive polymer film on the surface of the electrode base material 7 or the conductive film-attached electrode base material, and then growing the conductive polymer particles by performing the chemical polymerization, by using the conductive polymer particle dispersion liquid or paste which is separately produced, can be also used.

The thickness of the catalyst layer 6 of the opposite electrode 9 is suitably 5 nm to 5 μm, and particularly preferably 50 nm to 2 μm.

After preparing materials of each constituent element described above, the metal oxide semiconductor electrode and the catalyst electrode are assembled so as to be opposite to each other by the intermediary of the electrolyte by the well-known method of the related art, and thus, the photoelectric conversion element 10 can be completed.

EXAMPLES

Hereinafter, the present invention will be described in more detail based on Examples, however, the present invention is not limited thereto.

Example 1

Production of Porous Metal Oxide Semiconductor

The porous metal oxide semiconductor layer 3 is formed on the transparent conductive film 2 which is formed of $SnO_2$ obtained by doping fluorine on the transparent substrate 1 formed of glass and which is formed by vacuum deposition, by the following method.

As the electrode base material 8 in which the transparent conductive film 2 is formed on the transparent substrate 1, using FTO glass (manufactured by Nippon Sheet Glass Co., Ltd.), commercially available titanium oxide paste (product name: TSP-18NR, particle size of 20 nm manufactured by JGC Catalysts and chemicals, Ltd.) was printed on the surface thereof in a transparent conductive film 2 side, to have a film thickness of about 6 μm and an area of about 5 mm×10 mm by the screen printing method, commercially available titanium oxide paste (product name: TSP-400C, particle size of 400 nm manufactured by JGC Catalysts and chemicals, Ltd.) was further coated on the same area thereof to have a film thickness of about 4 μm by the screen printing method, and burning in the atmospheres was performed at 500° C. for 30 minutes. As a result, a titanium oxide film (porous metal oxide semiconductor film 3) having a film thickness of about 10 μm was obtained.

[Adsorption of Sensitizing Dye]

As the sensitizing dye 4, a bis(4-carboxy-4'-tetrabutyl ammonium carboxy-2,2'-bipyridine)diisothiocyanate ruthenium complex (manufactured by Solaronix SA.) which is generally called N719 dye was used. The porous titanium oxide semiconductor electrode was immersed in a dehydrated ethanol solution having dye concentration of 0.4 mmol/L, and left in a light shielding state overnight. After that, extra dye was washed in dehydrated ethanol and dried by air, and thus a solar cell semiconductor electrode was produced.

[Preparation of Electrolyte]

Next, an electrolyte configuring the electrolyte layer 5 was prepared. That is, using 1-methyl-3-ethylimidazolium bis (fluorosulfonyl)imide (EMIm-FSI, product name: ELEX- CEL IL-110 manufactured by DAI-ICHI KOGYO SEIYAKU CO., LTD.) as a solvent, the electrolyte was prepared by dissolving 1.1 mol/L of 5,5'-dithiobis(1-methyl-1H-tetrazole)((MTZT)$_2$), 0.1 mol/L of 1-methyl-5-mercapto-1,2,3,4-tetrazole: lithium salt (Li-MTZT), 1.0 mol/L of 1-methyl-5-mercapto-1,2,3,4-tetrazole: 1-methyl-3-ethylimidazolium salt (EMIm-MTZT), and 0.5 mol/L of N-methylbenzimidazole (NMBI) thereto.

[Production of Opposite Electrode]

As the opposite electrode 9, p-toluenesulfonic acid-doped poly(3,4-ethylene dioxythiophene) (hereinafter, PEDOT-PTS) opposite electrode was used. Using the FTO coating film-attached glass (manufactured by ASAHI GLASS CO., LTD., equal to or less than 10Ω/□) as the electrode substrate 7, a reaction solution which is obtained by dissolving 3,4-ethylene dioxythiophene, tris-p-toluenesulfonic acid iron (III), and dimethylsulfoxide in n-butanol in a ratio of 1:8:1 by a weight ratio was coated on the electrode substrate which was subject to ultrasonic cleaning in an organic solvent, by the spin-coating method. The spin coating was performed under conditions with the rotation conditions of 2000 rpm for 20 seconds, and the concentration of the 3,4-ethylene dioxythiophene was 0.48 M. Then, after performing polymerization by putting the solution-coated electrode substrate in a thermostatic bath which was maintained at 110° C. and heating for 5 minutes, an opposite electrode was produced by cleaning it with methanol. The film thickness of the produced PEDOT thin film was about 0.3 μm.

[Assembly of Solar Cell]

After providing an electrolyte injection hole of 1 mmφ at a suitable position on the opposite electrode 9 produced as described above by an electric drill, thermoplastic sheet (product: Himilan 1652 manufactured by Du Pont-Mitsui Polychemicals, film thickness of 25 μm) was interposed between the electrode substrate 8 (acting electrode) formed of the titanium oxide film 3 on the transparent substrate 1 which was provided with the transparent conductive film 2 produced as described above, and the opposite electrode, and by performing thermocompression bonding, both electrodes were adhered to each other. Next, after injecting the electrolyte produced as described above between both electrodes, a glass plate with a thickness of 1 mm was put on the electrolyte injection hole, was coated with a UV sealing agent (product name: 30Y-727 manufactured by ThreeBond Co., Ltd.), and was irradiated with UV light at an intensity of 100 mW/cm$^2$ for 30 seconds to execute the sealing, and thus, a solar cell element was produced.

Example 2

A solar cell element was produced in the same manner as in Example 1, except for using 1-methyl-5-mercapto-1,2,3,4-tetrazole: 1-methyl-1-propyl pyrrolidinium salt (MPPy-MTZT) instead of 1-methyl-5-mercapto-1,2,3,4-tetrazole: 1-methyl-3-ethylimidazolium salt (EMIm-MTZT) as the electrolyte layer 5.

Example 3

A solar cell element was produced in the same manner as in Example 1, except for using 1-methyl-5-mercapto-1,2,3,4-tetrazole: 1,2-dimethyl-3-propyl imidazolium salt (DMPIm-MTZT) instead of 1-methyl-5-mercapto-1,2,3,4-tetrazole: 1-methyl-3-ethylimidazolium salt (EMIm-MTZT) as the electrolyte layer 5.

Example 4

A solar cell element was produced in the same manner as in Example 1, except for using EMIm-FSI as a solvent and using the material prepared by dissolving 0.5 mol/L of (MTZT)$_2$, 1.4 mol/L of EMIm-MTZT, 0.1 mol/L of Li-MTZT, and 0.5 mol/L of NMBI thereto, as the electrolyte layer 5.

Example 5

A solar cell element was produced in the same manner as in Example 1, except for using the material prepared by dissolving 0.8 mol/L of (MTZT)$_2$, 1.5 mol/L of EMIm-MTZT, 0.1 mol/L of Li-MTZT, and 0.5 mol/L of NMBI in EMIm-FSI as a solvent, as the electrolyte layer 5.

Example 6

A solar cell element was produced in the same manner as in Example 1, except for using the material prepared by dissolving 0.8 mol/L of (MTZT)$_2$, 1.1 mol/L of EMIm-MTZT, 0.1 mol/L of Li-MTZT, and 0.5 mol/L of NMBI in EMIm-FSI as a solvent, as the electrolyte layer 5.

Comparative Example 1

A solar cell element was produced in the same manner as in Example 1, except for using the material obtained by dissolving 0.2 mol/L of iodine, 2.0 mol/L of 1,2-dimethyl-3-ethylimidazolium iodide (DMPIm-I), and 0.5 mol/L of N-methyl benzimidazole (NMBI) in 1-methyl-3-ethylimidazolium bis(trifluoromethanesulfonyl) imide (EMIm-FSI) as a solvent, as the electrolyte layer 5.

Comparative Example 2

A solar cell element was produced in the same manner as in Comparative Example 1, except for using a Pt opposite electrode (manufactured by GEOMATEC Co., Ltd.) obtained by performing deposition of Pt by the sputtering method on the ITO conductive glass, as the opposite electrode 9.

Comparative Example 3

A solar cell element was produced in the same manner as in Example 1, except for using the material obtained by dissolving 0.5 mol/L of 1-methyl-5-mercapto-1,2,3,4-tetrazole: tetramethyl ammonium salt, 0.5 mol/L of 2,2'-dithio bis(5-methyl-1,3,4-thiadiazole), and 0.5 mol/L of N-methylbenzimidazole (NMBI) in 1-methyl-3-ethylimidazolium bis(trifluoromethanesulfonyl)imide (EMIm-FSI) as a solvent, as the electrolyte layer 5.

Comparative Example 4

A solar cell element was produced in the same manner as in Example 1, except for using the material obtained by dissolving 2 mol/L of 5-methyl-2-mercapto-1,3,4-thiadiazole: 1-methyl-3-ethylimidazolium salt (EMIm-MTT), 0.2 M of 2,2'-dithiobis(5-methyl-1,3,4-thiadiazole), and 0.5 mol/L of N-methylbenzimidazole (NMBI) in 1-methyl-3-ethylimidazolium bis(trifluoromethanesulfonyl)imide (EMIm-FSI) as a solvent, as the electrolyte layer 5.

Synthesis examples of the redox couple used in Examples and Comparative Examples are shown below, however, the synthesis method is not particularly limited thereto.

[Redox Couple: Synthesis of Oxidants of Examples 1 to 6]

1 molar equivalent of 1-methyl-1,2,3,4-tetrazole-5-thiol and 0.5 molar equivalent of potassium carbonate are dissolved in methanol, and an ultrasonic bath process was performed while stirring until potassium carbonate melted away (about 2.5 hours). After that, a solid was removed using filter paper, the solvent was distilled way by a rotary evaporator, the generated white solid was cleaned in dichloromethane, and then by vacuum drying, 1-methyl-5-mercapto-1,2,3,4-tetrazole: potassium salt was synthesized. The reaction yield thereof was 82%.

Subsequently, after dissolving 1 mole of the synthesized compound in methanol, 0.5 molar equivalent of iodine was added, and the solution was stirred until the iodine was dissolved. After that, white precipitate generated by adding a large amount of water was collected by filtering, and was cleaned in water, and then, by vacuum drying for 24 hours, 5,5'-dithiobis(1-methyl-1H-tetrazole) which is an oxidant compound of the redox couple was obtained. The reaction yield thereof was 70%.

[Redox Couple: Synthesis of Reductant (Li Salt)]

In the synthesis of 1-methyl-5-mercapto-1,2,3,4-tetrazole: potassium salt, by using lithium carbonate instead of potassium carbonate, 1-methyl-5-mercapto-1,2,3,4-tetrazole: lithium salt was synthesized. The reaction yield thereof was 48%.

[Redox Couple: Synthesis of Reductant (EMIm Salt)]

A solution obtained by dissolving 1 molar equivalent of 1-methyl-1,2,3,4-tetrazole-5-thiol in methanol and a solution obtained by dissolving 1 molar equivalent of 1-methyl-3-ethylimidazoliumhydrogencarbonate (EMIm-$HCO_3$) in methanol were mixed, and stirred for 3 hours, and then, by performing distillation of the solvent by the rotary evaporator, 1-methyl-5-mercapto-1,2,3,4-tetrazole: EMIm salt which is liquid at room temperature was synthesized. The reaction yield thereof was 98%.

[Redox Couple: Synthesis of Reductant (MPPy Salt)]

A solution obtained by dissolving 1 molar equivalent of 1-methyl-1,2,3,4-tetrazole-5-thiol in methanol and a solution obtained by dissolving 1 molar equivalent of 1-methyl-1-propyl pyrrolidinium hydroxide (MPPy-OH) in methanol were mixed, and stirred for 3 hours, and then, by performing distillation of the solvent by the rotary evaporator, 1-methyl-5-mercapto-1,2,3,4-tetrazole: MPPy salt which is liquid at room temperature was synthesized. The reaction yield thereof was 96%.

[Redox Couple: Synthesis of Reductant (DMPIm Salt)]

A solution obtained by dissolving 1 molar equivalent of 1-methyl-1,2,3,4-tetrazole-5-thiol in methanol and a solution obtained by dissolving 1 molar equivalent of 1,2-dimethyl-3-propylimidazolium hydroxide (DMPIm-OH) in methanol were mixed, and stirred for 3 hours, and then, by performing distillation of the solvent by the rotary evaporator, 1-methyl-5-mercapto-1,2,3,4-tetrazole: DMPIm salt which is liquid at a room temperature was synthesized. The reaction yield thereof was 99%.

In addition, the redox couples used in Comparative Examples 3 and 4 were respectively synthesized based on the descriptions of NPL 6 and PTL 1.

[Evaluation of Photoelectric Conversion Efficiency and Durability of Solar Cell]

The evaluation of the solar cell produced as described above was executed by the following method. In the performance evaluation, after adjusting spectrum of AM 1.5 G in a solar simulator of a xenon lamp provided with an AM filter (XES-502S purchased from KANSAI KAGAKU KIKAI CO., LTD.), load characteristics (1-V characteristics) by a potentiostat was evaluated under irradiation conditions of 100 mW/$cm^2$. As evaluation values of the solar cell, open circuit voltage Voc (V), short-circuit current density Jsc (mA/$cm^2$), a form factor FF (–), and conversion efficiency η (%) are used, however, final quality of the performance of the solar cell was evaluated by the degree of the conversion efficiency. In addition, element performance retention under conditions of a dark place and room temperature were collectively evaluated.

In addition, in order to check the photoelectric conversion efficiency for each light wavelength, IPCE (incident-photo-to-current conversion efficiency) measurement was executed by using a spectral sensitivity measurement device (CEP-2000 manufactured by BUNKOUKEIKI Co., Ltd.).

In addition, as the evaluation in indoor light conditions, the element I-V characteristics were evaluated in the same manner, under conditions in which irradiation light in the solar simulator was reduced using 1% or 10% ND filter (manufactured by SIGMA KOKI Co., LTD.).

In addition, light irradiation intensity was calculated by comparing an irradiation light integrated value in area of λ: 400 nm to 800 nm with a value of reference solar light, using a spectrum analyzer (LS-100 manufactured by EKO Instruments Co., Ltd.).

The I-V characteristics evaluation results and stability evaluation results of the photoelectric conversion element of respective Examples and Comparative Examples under pseudo solar light irradiation conditions, are shown in Table 1.

TABLE 1

|  | Voc [V] | Jsc [mA/$cm^2$] | FF | η [%] | η retention after 30 days [%] |
|---|---|---|---|---|---|
| Example 1 | 0.61 | 8.91 | 0.60 | 3.2 | 100 |
| Example 2 | 0.60 | 7.64 | 0.59 | 2.7 | 98 |
| Example 3 | 0.59 | 8.26 | 0.58 | 2.9 | 99 |
| Example 4 | 0.63 | 9.66 | 0.60 | 3.6 | 100 |
| Example 5 | 0.61 | 9.31 | 0.62 | 3.6 | 100 |
| Example 6 | 0.61 | 9.23 | 0.60 | 3.4 | 100 |
| Comparative Example 1 | 0.62 | 7.35 | 0.64 | 2.9 | 100 |
| Comparative Example 2 | 0.63 | 4.25 | 0.27 | 0.7 | 98 |
| Comparative Example 3 | 0.59 | 5.20 | 0.61 | 1.9 | 97 |
| Comparative Example 4 | 0.60 | 3.99 | 0.61 | 1.5 | 53 |

As understood from Table 1, the photoelectric conversion elements of Examples 1 to 6 according to the present invention show the photoelectric conversion performance equal to or more than the element of Comparative Example 1 using use the same ionic liquid as a solvent and the iodine redox couple of the related art, under pseudo solar light irradiation conditions. In the cobalt complex redox couple shown in NPL 1 to 3, since the element performance under pseudo solar light irradiation conditions is about half the iodine redox couple, the redox couple of the present invention is more excellent. Further, since in the cobalt complex described above, reverse electron transfer for receiving the electrons from the surface of the FTO conductive glass which is an acting electrode substrate easily occurs, it is necessary to provide a fine semiconductor layer such as titanium oxide between the FTO conductive glass and the porous semiconductor layer in order to prevent contacting of the electrolyte layer and the surface of the conductive layer, however, since the redox couple of the present invention has low reactivity on the FTO conductive glass, even if a fine layer is not provided, the high element performance described above can be shown and the practicality is high.

Figure 2:
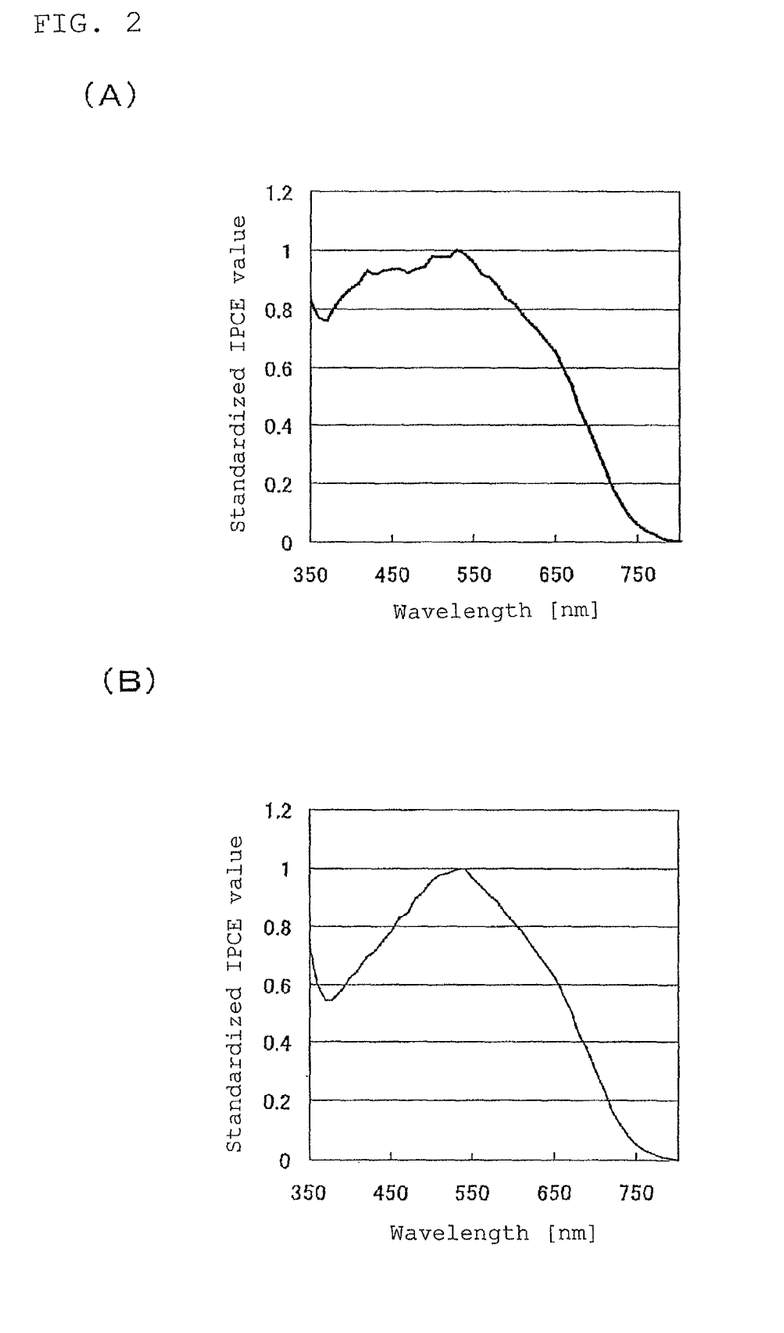
FIG. 2(A) is a view showing a result of IPCE (incident-photo-to-current conversion efficiency) measurement of Example 1.
FIG. 2(B) is a view showing a result of IPCE measurement of Comparative Example 1.

FIGS. 2(A) and 2(B) respectively show results of the IPCE measurement of the photoelectric conversion element (standardized results by the IPCE maximum value) of Example 1 and Comparative Example 1. It is found that, in Example 1 using the redox couple of the present invention, the IPCE value in the vicinity of λ: 350 nm to 500 nm is high, compared to Comparative Example 1 using the iodine redox couple of the related art. This shows that, in Comparative Example 1, absorption of iodine occurs in the vicinity of the wavelength, the iodine redox couple absorbs light, and the light absorption of the dye is disturbed, and as a result, the IPCE value is decreased. On the other hand, since the redox couple of Example 1 does not have strong absorption property in the visible light area, the IPCE value in the vicinity of λ: 350 nm to 500 nm is increased. It is also found from the fact that the short-circuit current values (Jsc) of Examples 1 to 3 are high compared to that of Comparative Example 1, in the I-V characteristics evaluation results shown in Table 1.

Returning to Table 1, the element performance of Comparative Example 2 using the Pt electrode as the opposite electrode is more degraded, and particularly the value of FF is much lower than that of Example 1 using the PEDOT electrode as the opposite electrode. This is because that PEDOT has higher catalytic activity with respect to the sulfide redox couple used in the present invention than Pt electrode. This can also be confirmed from boundary reaction resistance analysis by impedance measurement which will be described later. Therefore, it can be said that, in the present invention, by using the specified redox couple and the conductive polymer catalyst such as PEDOT together, a photoelectric conversion element which shows high photoelectric conversion efficiency can be produced.

In addition, it is found that, since solubility of the reductant to the ionic liquid in Comparative Example 3 using 1-methyl-5-mercapto-1,2,3,4-tetrazole: tetramethyl ammonium salt shown in NPL 6 as the reductant is lower than that of the compound of the present invention, only about 0.5 M of dissolution is performed, and as a result, the photoelectric conversion performance is degraded compared to that of Example 1.

Further, since the solubility of the disulfide compound, which is oxidant, to the solvent in Comparative Example 4 using a sulfide redox having a thiadiazole skeleton shown in PTL 1 as the redox couple is low, the photoelectric conversion performance is degraded compared to that of Example 1, and since the electrolyte is not stabilized under high concentration conditions, the element performance retention after 30 days is decreased to about 50%. On the other hand, degradation of element performance was not found even after 30 days, in Examples 1 to 6 of the present invention. Therefore, it is found that by assembling the redox couple of the present invention, the conductive polymer catalyst, and the ionic liquid, a practical photoelectric conversion element can be produced.

In addition, when comparing Example 1 and Examples 4 to 6, it is found that the element performance is further improved in a case of using the excessive mole number of the compound (reductant) represented by General Formula (1) compared to the mole number of the compound (oxidant) represented by Formula (2). The reason thereof is not clear, however, in a case of using excessive reductant, it is considered that the charge transfer performance is improved by promoting formation of charge transfer complex from the oxidant ($T_2$) and the reductant ($T^-$) (shown as $T_2 \cdot T^- \rightarrow T_3^-$). In addition, the fact that the conversion reaction of the charge which occurs between the oxidant and the reductant more easily occurs in a case of using the excessive reductant is considered as one reason to improve the element performance.

Figure 3:
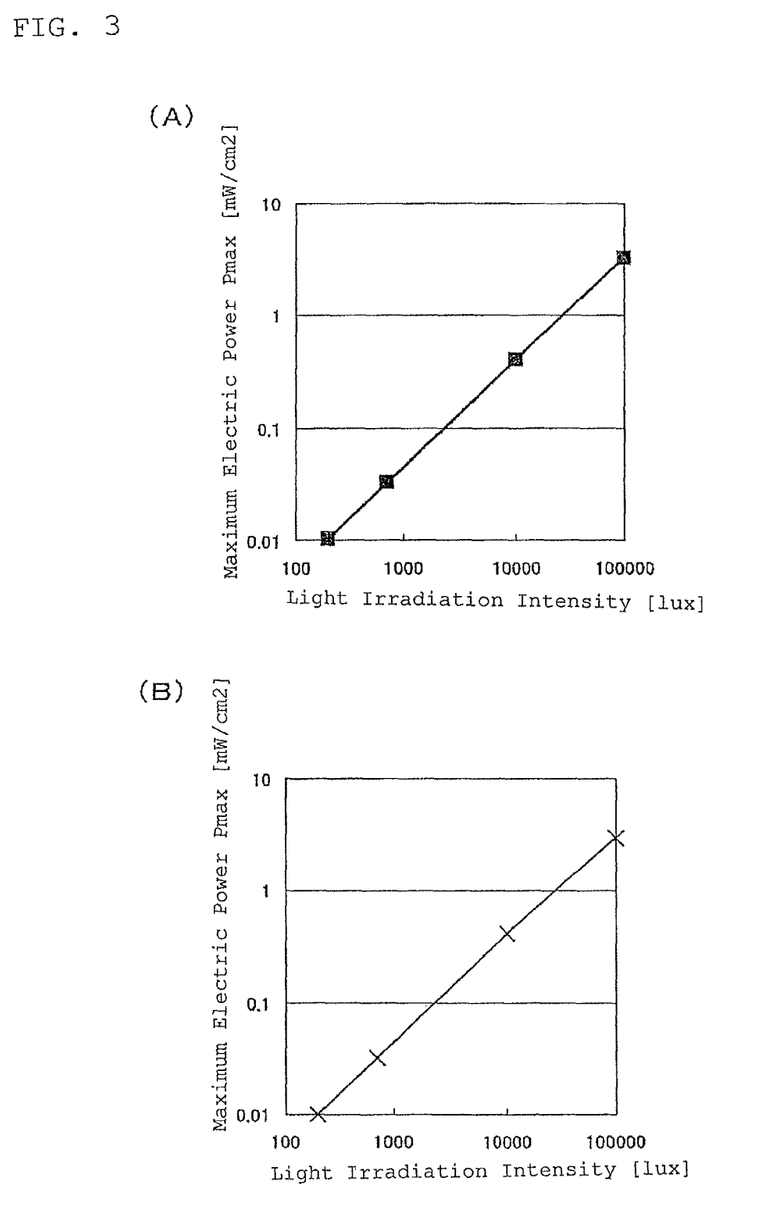
FIG. 3(A) is a view showing a relationship of light irradiation intensity and maximum electric power of an element produced in Example 1.
FIG. 3(B) is a view showing a relationship of light irradiation intensity and maximum electric power of an element produced in Comparative Example 1.

FIG. 3 shows the light irradiation intensity and element power generation performance of elements of Example 1 and Comparative Example 1. (A) shows Example 1 and (B) shows Comparative Example 1. As understood from the drawings, even in the weak light conditions, the photoelectric conversion element of the present invention shown in Example 1 shows the power generation property equivalent to or more than that of Comparative Example 1 using the iodine redox couple of the related art. This shows that the photoelectric conversion element of the present invention is efficiently operated even in the weak light conditions, and therefore, it can be said that the photoelectric conversion element of the present invention has high practicability.

[Production of Element for Electrolyte Evaluation and Evaluation of Electrolyte Property]

In order to compare the property of the electrolyte itself which dissolves each redox couple, in Examples 1 to 4 and Comparative Example 1, by producing sandwich cells by the same method as in Example 1, except for using the PEDOT opposite electrode of the opposite electrode instead of the acting electrode, opposite electrode/electrolyte/opposite electrode element for the electrolyte evaluation was produced. Examples 1', 2', 3' and 4' and Comparative Example 1' are set to correspond to Examples 1, 2, 3, and 4 and Comparative Example 1, respectively.

With the elements, cyclic voltammetry (CV) measurement and impedance (IMP) measurement were performed by an impedance analyzer (IM6 manufactured by BAS Inc.) and the electrolyte properties were compared. Conditions of each measurement are shown below.

Figure 4:
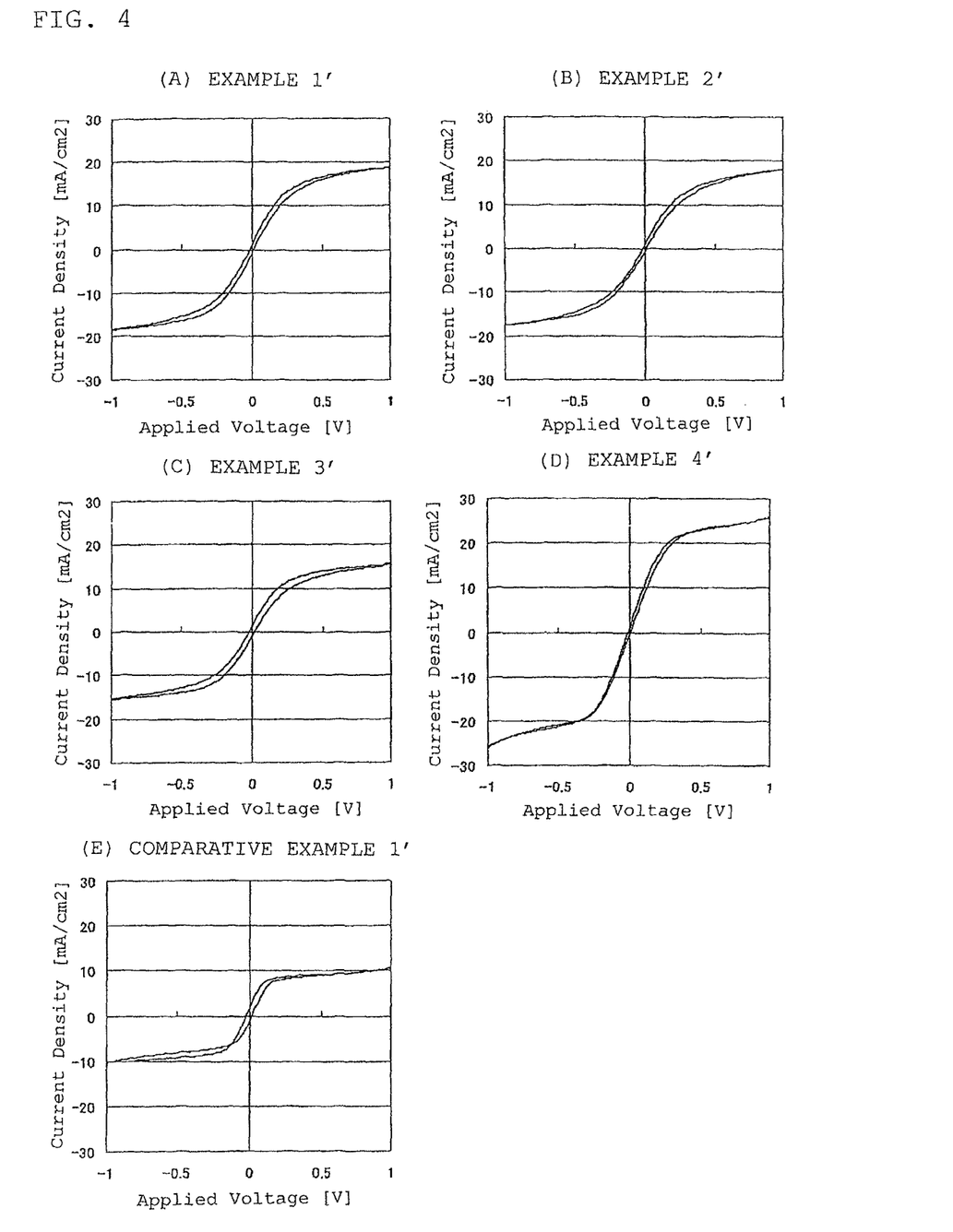
FIG. 4 are views showing results of electrolyte evaluation using elements for electrolyte evaluation of Examples 1' to 4' and Comparative Example 1'.

CV measurement conditions; Measurement range: −1 V to 1 V, Sweep speed: 10 mV/sec IMP measurement conditions; Measurement range: 1 MHz to 100 mHz, Amplitude: 10 mV, Applied voltage: 0 V FIG. 4 shows the results of CV measurement. (A) shows Example 1', (B) shows Example 2', (C) shows Example 3', (D) shows Example 4', and (E) shows Comparative Example 1'. From the drawings, it is found that in all Examples 1' to 4' using the redox couple and the ionic liquid of the present invention, a large amount of current can flow and the performance as the electrolyte is excellent, compared to Comparative Example 1' using the iodine redox couple and the ionic liquid of the related art as the electrolyte. Therefore, it can be said that sufficient element performance can be exhibited even in a case using a technically advanced element by improvement of acting electrodes ($TiO_2$ electrode and dye). In addition, by the impedance measurement, it is confirmed that the boundary resistance between the redox couple and the opposite electrode catalyst of Examples 1' to 4' is sufficiently small to the same extent as the boundary resistance between the iodine redox couple and the opposite electrode catalyst of Comparative Example 1'. This shows that, the oxidation-reduction reaction on the conductive polymer opposite electrode catalyst of the redox couple dissolved in the ionic liquid of the present invention is as excellent as the iodine redox couple of the related art.

As understood from Examples and Comparative Examples described above, the photoelectric conversion element of the present invention is more excellent than that of the iodine redox couple of the related art, from viewpoints of the element performance and transparency, and by using the redox couple, the ionic liquid, and the organic conductive polymer opposite electrode specified in the present invention, a solar cell element having high practicability with an excellent performance, durability, cost, and a design property can be provided.

INDUSTRIAL APPLICABILITY

The photoelectric conversion element according to the present invention is suitably used as a photoelectric conversion element which can be used outdoors, and by using the properties of the electrolyte of the present invention, it can be used for a device for consumer use which particularly requires a design property. Further, not only as the photoelectric conversion element, but photoelectric conversion element can also be used as a light sensor or the like.

REFERENCE SIGNS LIST

1: Transparent substrate
2: Transparent conductive film
3: Porous metal oxide semiconductor (layer)
4: Sensitizing dye
5: Electrolyte layer
6: Catalyst layer
7: Electrode base material
8: Electrode substrate (acting electrode)
9: Opposite electrode
10: Photoelectric conversion element

The invention claimed is:

1. A photoelectric conversion element comprising a semiconductor electrode, an opposite electrode, and an electrolyte layer held between the semiconductor electrode and the opposite electrode,
wherein the electrolyte layer includes a redox couple formed of a compound represented by the following General Formula (1) and a compound represented by Formula (2), and ionic liquid including bis(fluorosulfonyl)imide anion represented by Formula (3),

[Chem. 1]

(1)

[Chem. 2]

(2)

[Chem. 3]

(3)

Herein, in General Formula (1), A represents Li, an imidazolium compound represented by the following General Formula (4), or a pyrrolidinium compound represented by General Formula (5),

[Chem. 4]

(4)

[Chem. 5]

(5)

Herein, in General Formula (4), $R^1$ represents an alkyl group having 1 to 12 carbon atoms, $R^2$ represents a hydrogen atom or a methyl group, and in General Formula (5), $R^3$ represents an alkyl group having 1 to 12 carbon atoms.

2. The photoelectric conversion element according to claim 1, wherein a concentration of the compound represented by General Formula (1) in the electrolyte layer is equal to or more than 0.5 mol/L, and a concentration of the compound represented by Formula (2) is equal to or more than 0.5 mol/L.

3. The photoelectric conversion element according to claim 1 or 2, wherein the opposite electrode contains a conductive polymer catalyst having catalytic activity with respect to the redox couple.

\* \* \* \* \*